United States Patent Office 3,433,803
Patented Mar. 18, 1969

3,433,803
SUBSTITUTED IMINO-1,3-OXATHIOLS AND THEIR PREPARATION
Gerhard F. Ottmann, Hamden, and Haywood Hooks, Jr., West Haven, Conn., assignors to Olin Mathieson Chemical Corporation, New Haven, Conn., a corporation of Virginia
No Drawing. Continuation-in-part of application Ser. No. 417,501, Dec. 10, 1964. This application Dec. 1, 1966, Ser. No. 598,186
U.S. Cl. 260—327                    14 Claims
Int. Cl. C07d 89/06; A01n 9/12

ABSTRACT OF THE DISCLOSURE

A series of substituted imino-1,3-oxathiols are provided by the reaction of selected S-chloroisothiocarbamyl chlorides with selected ketones having at least one methylene group immediately adjacent to the carbonyl group. The substituted imino-1,3-oxathiols are useful as agricultural chemicals.

---

This application is a continuation-in-part of U.S. Ser. No. 417,501, filed Dec. 10, 1964, now abandoned.

This invention relates to the preparation of substituted imino-1,3-oxathiols and their hydrochloride salts. More specifically it relates to the preparation of imino-1,3-oxathiols having the following general formula:

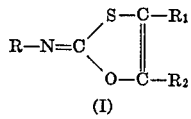

(I)

wherein R is alkyl, cycloalkyl, aryl or substituted aryl; R₁ is hydrogen, alkyl, aryl or aralkyl; and R₂ is alkyl, cycloalkyl, aryl, or substituted aryl; or wherein R₁ and R₂ together comprise a number of methylene groups bridging and connecting the two ring carbon atoms connected by the double bond in the above formula; and to the preparation of the hydrochloride salts of these imino-1,3-oxathiols.

It has recently been established that S-chloroisothiocarbamyl chlorides are provided by the reaction of various isothiocyanates with a substantially equivalent amount of chlorine at low reaction temperatures in the presence of an inert solvent. The reactions proceed as illustrated in the following equation wherein, for example, N-phenyl-S-chloroisothiocarbamyl chloride is prepared by adding chlorine to phenyl isothiocyanate:

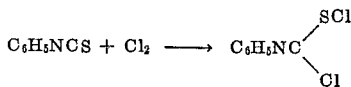

A more thorough and general description of the preparation of these derivatives is disclosed in our copending U.S. patent application, Ser. No. 370,051, filed May 25, 1964, now U.S. Patent 3,328,462. The resulting S-chloroisothiocarbamyl chlorides are sensitive to degradation by moisture, but they are surprisingly stable if handled properly. It has now been found that these chlorides react with selected ketones to provide a heretofore unknown series of substituted imino-1,3-oxathiols. Only those ketones having at least one methylene group, —CH₂—, immediately adjacent to the carbonyl group are suitable reactants in the practice of this invention. However, a wide variety of such ketones are suitable for use in the preparation of the derivatives I. Thus ketones of the type

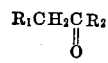

(wherein R₁ and R₂ are as previously defined) react with the S-chloroisothiocarbamyl chlorides to provide imino-1,3-oxathiols of the general Formula I. Similarly, cycloaliphatic ketones are advantageously employed in the practice of this invention to prepare the bridged derivatives also encompassed in the general Formula I.

Although a wide variety of S-chloroisothiocarbamyl chlorides having the formula RNC(Cl)SCl may be employed as reactants in the practice of this invention, it is preferred to utilize certain of these derivatives. Thus, particularly suitable reactants are those S-chloroisothiocarbamyl chlorides wherein R is alkyl having 1–18 carbon atoms; cycloalkyl having 5–7 carbon atoms as for instance cyclopentyl, cyclohexyl and cycloheptyl; an aryl hydrocarbon moiety having 6–8 carbon atoms as for instance phenyl, tolyl and xylyl; phenyl having a lower alkoxy (1–3 carbon atoms) substituent; halogenated phenyl especially monohalophenyl and dihalophenyl; and nitrated phenyl. As used in this application, the term "aryl" refers to those hydrocarbon moieties such as phenyl or naphthyl which may or may not have alkyl substituents. The preparation of the above S-chloroisothiocarbamyl chlorides which are preferred reactants in the practice of this invention is described as well as other similar chlorides in the aforementioned copending Ser. No. 370,051, now U.S. Patent 3,328,462, and the disclosure in that application is incorporated by reference in this application.

Although all of the imino-1,3-oxathiols (I) are synthesized from S-chloroisithiocarbamyl chlorides and the aforementioned ketones, it is a distinctive feature of this invention that two different processes are essential to provide the entire set of imino-1,3-oxathiol derivatives covered herein. To be more specific, a certain group of derivatives encompassed by the general Formula I can only be prepared by a process designated herein as "Method A," while another group of derivatives included in (I) can only be prepared by a different process herein called "Method B." The use of Method A or B in the preparation of the compounds I is dependent upon the type of ketone employed in the reaction with the S-chloroisothiocarbamyl chlorides.

Thus "Method A" as defined herein is the method suitable for preparing imino-1,3-oxathiols by the reaction of S-chloroisothiocarbamyl chlorides with ketones of the formula

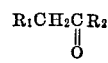

wherein R₁ is hydrogen, alkyl, aryl or aralkyl; and R₂ is aryl and substituted aryl. Preferentially employed in this method are aryl alkyl ketones and aryl aralkyl ketones. The imino-1,3-oxathiols (I) which are obtained by employing "Method A" are herein called imino-1,3-oxathiols "A."

It is believed that the formation of the imino-1,3-oxathiols "A" from the reaction of S-chloroisothiocarbamyl chlorides with the above ketones proceeds through the formation of instable intermediates which then lose one mole or hydrogen chloride to form a salt which is the hydrochloride of the final "oxathiol A." This sequence is illustrated in the following equation wherein, for example, N-phenyl-S-chloroisothiocarbamyl chloride is reacted with acetophenone.

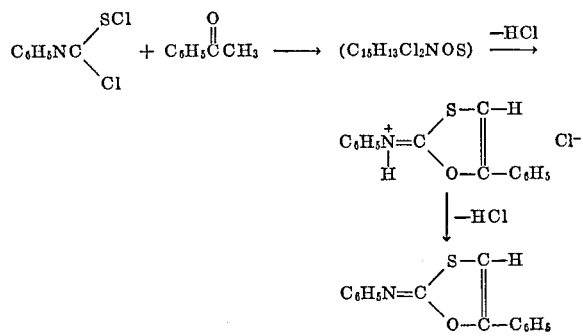

Thus, the process for providinng the imino-1,3-oxathiols "A" of this invention comprises reacting the aforementioned S-chloroisothiocarbamyl chlorides with the selected ketones to provide the hydrochloride salt of an imino-1,3-oxathiol which can be subsequently converted to the free base. The reactions are preferably carried out in the presence of a diluent, but if the ketone reactant is a liquid an excess of this material can itself be conveniently employed as the diluting medium. Suitable diluents include ethers such as diethyl ether, aliphatic hydrocarbons such as pentane, hexane and the like, and aromatic hydrocarbons such as benzene, toluene, the xylenes, and the like. A reaction temperature range of about 0° C. to about 70° C., and even more preferentially 25°–55° C. should be utilized in the reaction of the ketone with the chloride. Although the mode of addition of the reactants is not critical, best results have been obtained when the chloride is added to the ketone reactant.

The imino-1,3-oxathiol products may be isolated if desired at this point in the form of their hydrochloride salts. These salts are readily isolated from the reaction mixture by utilizing conventional separation procedures such as filtering, centrifugation and so forth. Alternatively, all diluents may be removed from the reaction mixture to obtain a residual mixture of an oil admixed with the salt wherein separation of the salt can be achieved by filtration or by extraction of the oil with an appropriate organic solvent in which the salt is not soluble as, for instance, benzene.

The aforementioned hydrochlorides are the salts of weak bases and strong acids, and they are readily converted to the imino-1,3-oxathiols by methods known to those skilled in this art. For instance, the free base may be isolated by treating the salt with a strong organic base such as triethylamine and the like in an inert solvent such as benzene or ether.

The imino-1,3-oxathiols "A" are also provided by adding the hydrochlorides to aqueous solutions of alkali hydroxides and alkali carbonates, such as sodium hydroxide, potassium hydroxide, sodium carbonate, potassium carbonate and the like. Similar procedures for obtaining the imino-1,3-oxathiols "A" from their hydrochloride salts employ solutions of the said bases in mixtures of water and lower alcohols, as well as in lower alcohols alone particularly those having 1–5 carbon atoms. The imino-1,3-oxathiols "A" are furthermore provided by dispersing the hydrochlorides in water wherein the free base precipitates due to its high insolubility in water.

The use of the simplest aryl alkyl ketone, acetophenone, as a reactant with the aforementioned chlorides provides imino-1,3-oxathiols of the Formula I wherein $R_1$ is hydrogen and $R_2$ is a phenyl group. Higher aryl alkyl ketone reactants such as ethyl aryl ketones yield oxathiols wherein $R_1$ is alkyl and $R_2$ is an aryl moiety. Preferred embodiments of this invention include those derivatives where $R_1$ is alkyl having 1–8 carbon atoms. The aryl hydrocarbon group in the beginning ketone reactant (represented by $R_2$ in the general Formula I is preferably one having 6–8 carbon atoms such as phenyl, tolyl and xylyl, or a substituted phenyl group particularly halogenated phenyl, nitrated phenyl or phenyl having a lower alkoxy substituent. Thus, among the ketones which are employed in the practice of this invention for preparing derivatives of the Formula I by "Method A" are o, m, and p-chloroacetophenone; o, m, and p-bromoacetophenone; o, m, and p-fluoroacetophenone; o, m, and p-nitroacetophenone; o, m, and p-methoxyacetophenone and like materials.

Aryl aralkyl ketones may also be conveniently utilized in the practice of this invention. For instance, desoxybenzoin ($C_6H_6CH_2COC_6H_5$) reacts with S-chloroisothiocarbamyl chlorides to provide oxathiols included in the Formula I wherein both $R_1$ and $R_2$ are aryl hydrocarbon groups. Likewise when $C_6H_5CH_2CH_2COC_6H_5$ is, for example, employed as a reactant with the S-chloroisothiocarbamyl chlorides, oxathiols (I) wherein $R_1$ is aralkyl and $R_2$ is aryl are obtained. Preferred embodiments of this invention include those where $R_1$ is aryl having 6–8 carbon atoms and aralkyl having 7–9 carbon atoms.

"Method B" as defined herein is the method suitable for preparing imino-1,3-oxathiols by the reaction of S-chloroisothiocarbamyl chlorides with ketones of the formula

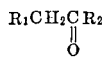

wherein $R_1$ is hydrogen, alkyl, aryl, or aralkyl; and $R_2$ is cycloalkyl and alkyl. Similarly, cycloaliphatic ketones react with the S-chloroisothiocarbamyl chlorides in accordance with "Method B" to provide the heretofore disclosed bridged compounds included in the general Formula I.

It is believed that the formation of the imino-1,3-oxathiols "B" proceeds by a reaction sequence which is illustrated in the following equation wherein, for example, the reaction of N-phenyl-S-chloroisothiocarbamyl chloride with cyclohexanone is exemplified.

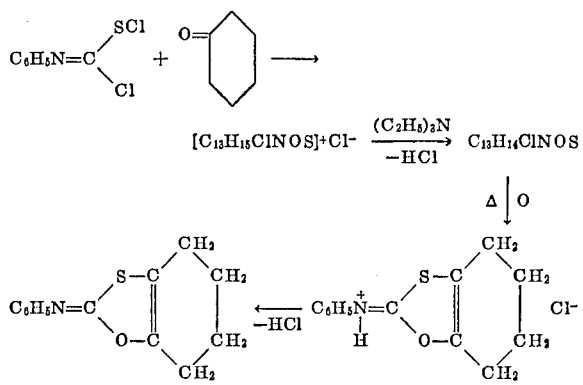

Thus, the process for providing the imino-1,3-oxathiols "B" of this invention involves first the reaction of the S-chloroisothiocarbamyl chlorides with the aforementioned selected ketones to provide as a first intermediate a solid reaction product which is believed to be the hydrochloride of an amine base but not the hydrochloride of the imino-1,3-oxathiol "B." This reaction is preferably carried out in the persence of a diluent, but if the ketone reactant is a liquid an excess of this material can itself be conveniently employed as a diluting medium. Suitable diluents include ethers such as diethyl ether, aliphatic hydrocarbons such as pentane, hexane and the like, and aromatic hydrocarbons such as benzene, toluene, the xylenes, and the like. A reaction temperature range of about 0° C. to about 70° C., and even more preferentially 25°–55° C. should be utilized in the reaction of the ketone with the chloride. Although the mode of addition of the reactants is not critical, best results have been obtained when the chloride is added to the ketone reactant.

This first solid intermediate is readily isolated from the reaction mixture by utilizing conventional separation procedures such as filtering, centrifugation and so forth, and it is subsequently converted to a second intermediate product by removal of one mole of hydrogen chloride. The second intermediate product is the free amine base of the preceding first intermediate which is as previously stated the hydrochloride salt of an amine base. Conversion of the first intermediate product to the second intermediate product is effected by treating the first product with a strong organic base wherein the free amine base is obtained. Ammonia itself, for instance, cannot be utilized in this procedure. The organic bases employed must, of course, be stronger than the free amine formed as the second intermediate product. Furthermore, primary and secondary amines are unsuitable here since they are reactive with the first intermediate to form undesirable byproducts. Thus, among the preferred strong organic bases which may be employed in this procedure are tertiary amines such as trimethyl amine, triethylamine, and other analogous trialkyl amines, N-alkyl morpholines especially the lower alkyl derivatives, and N-alkyl piperidines such as N-methyl piperidine. The treatment with bases of the above type is preferably carried out in an indifferent anhydrous solvent at a temperature between $-30°$ C. and $50°$ C. but preferably between $0°$ C. and $25°$ C. Solvents suitable for this operation are anhydrous ethers, such as diethyl ether, aliphatic hydrocarbons, such as pentane, hexane, heptane and the like, aromatic hydrocarbons such as benzene, toluene and the like. The separation of the second intermediate compound is readily accomplished by removal of the precipitated tertiary amine hydrochloride by filtration and evaporation of the solvent from the filtrate in vacuo at temperatuers not exceeding $40°$ C. These operations provide the second intermediate compound in form of an oily liquid.

The next and third step of "Method B" comprises a thermal rearrangement of the second intermediate product to provide the hydrochloride of the final imino-1,3-oxathiol "B." This arrangement is accomplished by heating the second intemediate product at a temperature of at least about $40°$ C. but not higher than $200°$ C. and preferably between $50°–110°$ C. This operation may be performed by heating the second intermediate product either undiluted or diluted by an inert diluent such as an aliphatic or aromatic hydrocarbon as heptane, benzene and the like or a ketone solvent such as acetone. The rearrangement is accompanied by a sudden change of the physical state of the reactant, that is, formation of a hard solid from the oily liquid. If a diluent was used in this operation, the reaction product is separated by a simple filtration or even decantation.

The hydrochlorides of the imino-1,3-oxathiols "B" are converted to the imino-1,3-oxathiols by methods known to those skilled in this art as, for instance, those methods reported in the preceding discussion for the preparation of the imino-1,3-oxathiols "A" from their hydrochloride salts.

The use of the simplest dialkyl ketone, acetone, as a reactant with the aforementioned chlorides provides imino-1,3-oxathiols of the Formula I wherein $R_1$ is hydrogen and $R_2$ is a methyl group. Higher dialkyl ketone reactants provide oxathiols wherein both $R_1$ and $R_2$ are alkyl moieties. Thus, the use of methyl ethyl ketone as higher dialkyl ketone reactant yields oxathiols wherein $R_1$ is a methyl group and $R_2$ is a methyl group. Preferred embodiments of this invention are provided when those dialkyl ketones are utilized in the reaction with the chlorides to provide the derivatives I wherein both $R_1$ and $R_2$ are alkyl having 1–8 carbon atoms. Alkyl cycloalkyl ketones are also employed in the reaction with the chlorides via "Method B" to provide derivatives included in the general Formula I wherein $R_1$ represents hydrogen or alkyl and $R_2$ represents a cycloalkyl group having 5–7 carbon atoms as, for instance, cyclopentyl, cyclohexyl, and the like.

As mentioned in the preceding discussion cycloaliphatic ketones also are used in the preparation of the bridged derivatives included in the general Formula I. Thus, cyclohexanone reacts readily with the S-chloroisothiocarbamyl chlorides to provide imino-1,3-oxathiols wherein the substituents $R_1$ and $R_2$ have combined to provide a tetramethylene bridge, $—(CH_2)_4—$, as shown in the following structural formula:

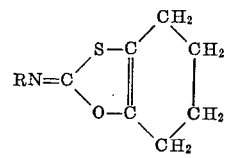

When cyclopentanone is employed as the ketone reactant, the two carbon atoms connected by the double bond are linked by a trimethylene bridge, $—(CH_2)_3—$. Preferred embodiments of this invention are provided wherein cycloaliphatic ketones are utilized as reactants to prepare imino-1,3-oxathiols of the Formula I wherein $R_1$ and $R_2$ together comprise a polymethylene bridge, $—(CH_2)_n—$, wherein $n$ is 3–12.

The imino-1,3-oxathiols of this invention are useful as agricultural chemicals since they have demonstrated good activity in several pesticidal areas. For instance, they are valuable nematocides particularly in the control of the rootknot nematode *Meloidogyne incognita* on tomato plants and can be used in this application without damage to the tomato plants. The oxathiols are also useful as foliar fungicides against a variety of harmful fungi including special effectiveness against the cucumber powdery mildew, *Erisyphe cichoracearum*, an obligate parasite which is particularly damaging to young cucumber plants. A number of the imino-1,3-oxathiols have been found to have considerable activity as herbicides against a variety of broadleaf and grassy weeds when utilized in pre-emergence treatment.

The following examples will serve to illustrate the preparation of several of the imino-1,3-oxathiols of this invention.

EXAMPLE 1

An amount of 103 g. (0.5 mole) of N-phenyl-S-chloroisothiocarbamyl chloride was added dropwise to a solution of 75 g. (0.575 mole) of acetophenone in 150 ml. of ether. The carbamyl chloride was added at such a rate that the exothermic reaction kept the reaction mixture in a state of gentle reflux. After complete addition, the mixture was stirred at $25°–30°$ C. for 18 hours. A solid precipitate which had slowly developed during the reaction period was recovered from the reaction mixture by filtration, washed with ether and pentane, and dried. There was obtained 81 g. of a white solid which melted at $210°–212°$ C. Elementary analysis revealed the empirical formula of this material to be $C_{15}H_{12}ClNOS$.

An amount of 42 g. of this product was added to 300 ml. of water and brought to boiling for a short period. After cooling, 35 g. of a solid precipitate had formed which was separated and purified by recrystallization from 800 ml. of methanol. This operation afforded 23 g. (70% of the theory) of pure 2-phenylimino-5-phenyl-1,3-oxathiol, M.P. $137°–138°$ C., in the form of white flakes or flat needles.

*Analysis.*—Calcd. for $C_{15}H_{11}NOS$: C, 71.12; H, 4.38; N, 5.53; S, 12.65. Found: C, 71.51; H, 4.38; N, 5.86; S, 12.76.

EXAMPLE 2

Amounts of 103 g. of N-phenyl-S-chloroisothiocarbamyl chloride, 102 g. of propiophenone, and 50 ml. of ether were reacted as described in Example 1, but a reaction temperature of $50°$ C. was maintained throughout the addition. The reaction afforded 71 g. of $C_{16}H_{14}ClNOS$, M.P. $188°–189°$ C., in the form of a white microcrystalline solid. An amount of 50 g. of this compound was boiled in 300 ml. of water for 5 minutes. After cooling the aqueous mixture, 41 g. of a solid reaction product was removed by filtration, and recrystallized from 1100 ml. of methanol yielding 25.0 g. of pure 2-phenylimino-4-methyl-5-phenyl-1,3-oxathiol, M.P. 143°–144° C., in the form of white shiny plates.

*Analysis.*—Calcd. for $C_{16}H_{13}NOS$: C, 71.89; H, 4.91; N, 5.25; S, 11.99. Found: C, 71.99; H, 5.07; N, 5.44; S, 11.59.

EXAMPLE 3

An amount of 103 g. (0.5 mole) of N-phenyl-S-chloroisothiocarbamyl chloride was added dropwise to a solution of 4-methoxyacetophenone in 250 ml. of dry ether. A precipitate developed and hydrogen chloride evolved shortly after the addition was started. Upon completion of the addition, the reaction mixture was diluted by 500 ml. of ether and stirred overnight at 25° C. Then, the precipitate was removed by filtration, washed with ether and pentane, and dried yielding 48 g. of a white powder of the empiric formula $C_{16}H_{14}ClNO_2S$, M.P. 178°–179° C.

An amount of 26 g. of this product was heated in 200 ml. of water for a few minutes at reflux temperature and then cooled to 0° C. A solid precipitate was removed by filtration, and recrystallized from methanol yielding 10.5 g. of pure 2-phenylimino-5-(p-methoxyphenyl)-1,3-oxathiol, M.P. 159°–160° C. in the form of white, shiny plates.

*Analysis.*—Calcd. for $C_{16}H_{13}NO_2S$: C, 67.83; H, 4.62; N, 4.95; S, 11.29. Found: C, 67.91; H, 4.73; N, 5.07; S, 11.62.

EXAMPLE 4

To a solution of 94.6 g. of 3,4-dichloroacetophenone in 300 ml. of toluene was added dropwise and with stirring an amount of 103 g. of N-phenyl-S-chloroisothiocarbamyl chloride. The temperature of the reaction mixture was maintained at 45° to 50° C. by means of an external heat source. Upon completion of the addition, the mixture was stirred for 2.5 additional hours at the said temperature and 18 hours at room temperature. Then, 69.0 g. of an off-white precipitate was removed by filtration, washed with toluene and dried. A sample of 18 g. of this material was treated with hot water for 5 minutes, then cooled and filtered. The filter cake was recrystallized from methanol yielding 8.8 g. of 2-phenylimino-5-(3,4-dichlorophenyl)-1,3-oxathiol, M.P. 161° C.

EXAMPLE 5

To 600 ml. of dry acetone was added dropwise 103 g. (0.5 mole) of N-phenyl-S-chloroisothiocarbamyl chloride over a period of 1.5 hours with stirring. The temperature of the reaction mixture was maintained at 10°–15° C. After complete addition, the mixture was stirred for 5 more hours at room temperature and then filtered. The filter cake was washed with dry ether and finally with pentane. Yield: 87 g. (66% of the theory) of white crystalline powder, melting at 166°–168° C.

*Analysis.*—Calcd. for $C_{10}H_{11}Cl_2NOS$: C, 45.45; H, 4.19; Cl, 26.87; N, 5.30; S, 12.11. Found: C, 45.38; H, 4.41; Cl, 27.00; N, 5.69; S, 12.10.

An amount of 35 g. of the above reaction product was dispersed in 400 ml. of toluene and a solution of 13.9 g. of triethylamine in 30 ml. of toluene was added dropwise with stirring over a period of 1.5 hours. The reaction temperature was maintained at 20°–25° C. After stirring overnight, 19 g. of triethylamine hydrochloride were removed by filtration, and the filtrate was concentrated in vacuo to yield a dark colored oil which was heated in 150 ml. of boiling heptane for 15 minutes. After cooling, the solid was separated by filtration and purified by recrystallization from 800 ml. of dry acetone. Yield: 13.5 g. of 2-phenylimino-5-methyl-1,3-oxathiol hydrochloride, melting at 174°–175° C.

*Analysis.*—Calcd. for $C_{10}H_{10}ClNOS$: C, 52.75; H, 4.44; Cl, 15.59; N, 6.15; S, 14.05. Found: C, 52.75; H, 4.45; Cl, 16.30; N, 5.98; S, 14.04.

A slurry of 4.1 g. of the above prepared oxathiol hydrochloride in 50 ml. of ether, and 50 ml. of a 20% aqueous sodium hydroxide solution were vigorously agitated while being cooled by an external ice bath. The layers were separated and the aqueous phase extracted with fresh ether. The combined ether solutions afforded 2.5 g. 2-phenylimino-5-methyl-1,3-oxathiol which after recrystallization from 15 ml. of hexane melted at 47°–48° C.

*Analysis.*—Calcd. for $C_{10}H_9NOS$: C, 62.81; H, 4.74; N, 7.32; S, 16.73. Found: C, 62.66; H, 4.50; N, 7.21; S, 16.76.

EXAMPLE 6

Amounts of 103 g. (0.5 mole) of N-phenyl-S-chloroisothiocarbamyl chloride and 98 g. of cyclohexanone were reacted in 250 ml. of ether as described in Example 5. Yield: 121 g. (80% of the theory) of a white, microcrystalline powder, melting at 109°–111° C.

A slurry of 4.1 g. of the above prepared oxathiol hy- was treated with 88 g. of triethylamine in 100 ml. of ether for 2.5 hours at room temperature. Then the reaction mixture was filtered; the filter cake was extracted with ice water to afford 51 g. of reaction product. The filtrate, concentrated to one third of the original volume and stored at 0° C. overnight, yielded additional 40.7 g. of reaction product. Total yield: 91.7 g. (87% of the theory) of a white crystalline solid, M.P. 95°–96° C. (from heptane).

*Analysis.*—Calcd. for $C_{13}H_{14}ClNOS$: C, 58.31; H, 5.26; Cl, 13.27; N, 5.24; S, 11.95. Found: C, 58.61; H, 5.68; Cl, 13.40; N, 5.60; S, 12.07.

A 12.5 g. sample of this product was added portionwise to a small Erlenmeyer flask contained in an oil bath of 120° C. The product melted and immediately resolidified to afford 12 g. of 2-phenylimino-4,5-tetramethylene-1,3-oxathiol hydrochloride, M.P. 163°–164.5° C.

The crude hydrochloride was treated with a 20% aqueous solution of sodium hydroxide in the presence of ether at 10°–150 C. to afford 9 g. of 2-phenylimino-4,5-tetramethylene-1,3-oxathiol, M.P. 83°–83.5° C. (from heptane).

*Analysis.*—Calcd. for $C_{13}H_{13}NOS$: C, 67.52; H, 5.67; N, 6.06; S, 13.84. Found: C, 67.89; H, 5.77; N, 6.38; S, 13.96.

EXAMPLE 7

Amounts of 103 g. (0.5 mole) of N-phenyl-S-chloroisothiocarbamyl chloride and 86 g. of 2-heptanone were reacted in 125 ml. of ether as described in Example 5. A white solid precipitate (125 g., M.P. 105°–107° C.) was separated by filtration after 18 hours.

A slurry of 60 g. of this product in 200 ml. of ether was treated with excessive triethylamine (40.4 g.) for 18 hours at 20°–30° C. After separation of 28 g. of triethylamine hydrochloride, the filtrate was concentrated to yield 54 g. of brown viscous oil which upon standing solidified with evolution of heat. The solid was powderized and added to water whereby the water turned acidic and an oil developed which was extracted by ether. Distillation afforded 40 g. of 2-phenylimino-4-butyl-5-methyl-1,3-oxathiol, B.P. 152° C/0.2 mm. Hg, $n_D^{26}$ 1.5765.

*Analysis.*—Calcd. for $C_{14}H_{17}NOS$: C, 67.99; H, 6.93; N, 5.68; S, 12.94. Found: C, 68.09; H, 6.93; N, 6.28; S, 13.07.

The hydrochloride, prepared in ether under anhydrous conditions, melts at 110.5°–112° C.

EXAMPLE 8

To a stirred solution of 49 g. of cyclohexanone in 60 ml. of dry ether was added dropwise 73 g. of N-butyl-S-chloroisothiocarbamyl chloride at 25°–35° C. After storing the reaction solution for 18 hours at −25° C., a greasy precipitate (100 g.) had formed which was separated and freed from tenaciously adhering oil by means of a porous plate. After washing with ethyl acetate, the product, having the empiric formula $C_{11}H_{19}Cl_2NOS$, melted at 102°–104° C.

To a solution of 10 g. of this product in 150 ml. of ether was added a solution of 3.6 g. of triethylamine in 20 ml. of ether with stirring at 20°–25° C. After several hours, 5 g. of triethylamine hydrochloride was separated by filtration; the filtrate was concentrated to afford 9.5 g. of a straw-colored liquid which, when slightly warmed, became very hot and rearranged to 2-butylimino-4,5-tetramethylene-1,3-oxathiol hydrochloride, M.P. 86° C. (from toluene).

Analysis.—Calcd. for $C_{11}H_{18}ClNOS$: C, 53.32; H, 7.32; N, 5.65; S, 12.92. Found: C, 53.21; H, 7.75; N, 5.84; S, 13.12.

The hydrochloride (6.7 g.) was treated with 50 ml. of 10% aqueous sodium hydroxide in the presence of 50 ml. of toluene. Distillation of the dried toluene solution afforded 4.1 g. of 2-butylimino-4,5-tetramethylene-1,3-oxathiol, B.P. 111°–113° C./0.25 mm. Hg, $n_D^{25}$ 1.5292.

Analysis.—Calcd. for $C_{11}H_{17}NOS$: C, 62.54; H, 8.11; N, 6.63; S, 15.15. Found: C, 62.38; H, 8.16; N, 6.50; S, 15.27.

EXAMPLE 9

To a stirred solution of 60 g. of acetophenone in 60 ml. of dry ether was added dropwise 73 g. of N-butyl-S-chloroisothiocarbamyl chloride over a period of 1.5 hours at 20°–30° C. After stirring for 5.5 hours at room temperature, the reaction mixture was kept at 0° C. for 18 hours and then filtered to afford 80.5 g. of a white solid which was purified by washing with dry ether and then pentane.

An amount of 52 g. of this solid was slurried with 500 ml. of ether, and 37 g. of triethylamine in 50 ml. of ether was added dropwise with stirring and cooling (ice bath). The reaction mixture was filtered after 5 hours to afford 42 g. of triethylamine hydrochloride and 38 g. of tan colored crystals from the ether filtrate. The latter product was dissolved in carbon tetrachloride and after filtration recovered from this solution by evaporation of $CCl_4$. A final recrystallization of this product from hexane afforded pure 2-butylimino-5-phenyl-1,3-oxathiol, melting at 60.5°–61° C., in the form of white prisms.

Analysis.—Calcd. for $C_{13}H_{15}NOS$: C, 66.93; H, 6.48; N, 6.01; S, 13.72. Found: C, 67.10; H, 6.76; N, 6.09; S, 13.99.

The hydrochloride, prepared in toluene under anhydrous condition, has a melting point of 143.5°–144.5° C.

EXAMPLE 10

To a stirred mixture consisting of 35 g. of acetone and 250 ml. of hexane was added dropwise and with cooling a solution of 75 g. of N-butyl-S-chloroisothiocarbamyl chloride in 50 ml. of pentane at 25°–30° C. A precipitate developed soon after the addition was started. The reaction mixture was allowed to stand for 4.5 hours at room temperature, and was filtered after being stored for 18 hours in a refrigerator. The filter cake was washed with pentane and died to afford 57 g. of a white crystalline powder having the empirical composition $C_8H_{15}Cl_2NOS$.

To a stirred slurry of 36 g. of the above product in 400 ml. of dry ether was added dropwise 16.5 g. of triethylamine in 80 ml. of ether at room temperature. After 4 hours, 20.4 g. of triethylamine hydrochloride was separated by filtration, and the filtrate was concentrated to afford an ether soluble liquid which after approximately 15 minutes rearranged exothermally under solidification to form 30 g. of 2-butylimino-5-methyl-1,3-oxathiol hydrochloride, M.P. 158°–160° C.

The hydrochloride (19.7 g.) was treated with 10 g. of triethylamine in 250 ml. of ether. Removal of the solvent from the filtered reaction mixture left 12 g. of an oil which was recrystallized from pentane to afford 8.5 g. of pure 2-butylimino-5-methyl - 1,3 - oxathiol, M.P. 28°–28.5° C.

Analysis.—Calcd. for $C_8H_{13}NOS$: C, 56.12; H, 7.65; N, 8.18; S, 18.69. Found: C, 56.51; H, 8.03; N, 7.81; S, 18.90.

EXAMPLE 11

Amounts of 75 g. of N-butyl-S-chloroisothiocarbamyl chloride in 50 ml. of pentane and 81 g. of propiophenone in 250 ml. of ether were reacted as described in Example 10 to afford 50 g. of a white crystalline solid M.P. 104°–104.5° C., of the empiric formula $C_{14}H_{19}Cl_2NOS$.

A portion (34 g.) of the above product was converted to 2-butylimino-4-methyl-5-phenyl-1,3 - oxathiol hydrochloride with triethylamine as described in Example 10 (yield: 31.5 g. crude).

From 28.1 g. of the hydrochloride was obtained upon treatment with triethylamine—as outlined in Example 10—18.5 g. of pure 2-butylimino-4-methyl-5-phenyl-1,3-oxathiol, M.P. 31.5°–32° C. (from pentane).

Analysis.—Calcd. for $C_{14}H_{17}NOS$: C, 67.99; H, 6.93; N, 5.67; S, 12.94. Found: C, 68.38; H, 7.39; N, 5.68; S, 12.90.

What is claimed is:

1. A substituted imino-1,3-oxathiol having the formula

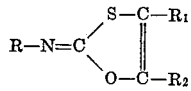

wherein R is selected from the class consisting of an aryl hydrocarbon having 6–8 carbon atoms, phenyl having a lower alkoxy substituent, monohalophenyl, dihalophenyl, and nitrophenyl; and wherein $R_1$ is selected from the class consisting of hydrogen, alkyl having 1–8 carbon atoms, an aryl hydrocarbon having 6–8 carbon atoms, and an aralkyl hydrocarbon having 7–9 carbon atoms; and wherein $R_2$ is selected from the class consisting of alkyl having 1–8 carbon atoms, cycloalkyl having 5–7 carbon atoms, an aryl hydrocarbon having 6–8 carbon atoms, monohalophenyl, nitrophenyl, and phenyl having a lower alkoxy substituent; or wherein $R_1$ and $R_2$ taken together comprise an alkylene group having from 3–12 carbon atoms;

and the hydrochloride salt of said substituted imino-1,3-oxathiol.

2. A compound having the formula

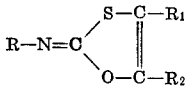

wherein R is alkyl having 1–18 carbon atoms and wherein $R_1$ and $R_2$ taken together comprise an alkylene group having from 3–12 carbon atoms.

3. A compound of claim 1 wherein R is an aryl hydrocarbon having 6–8 carbon atoms and wherein $R_1$ and $R_2$ taken together comprise an alkylene group having from 3–12 carbon atoms.

4. A compound of claim 1 wherein R is an aryl hydrocarbon having 6–8 carbon atoms, $R_1$ is hydrogen, and $R_2$ is an aryl hydrocarbon having 6–8 carbon atoms.

5. A compound of claim 1 wherein R is an aryl hydrocarbon having 6–8 carbon atoms, $R_1$ is hydrogen, and $R_2$ is phenyl having a lower alkoxy substituent.

6. A compound of claim 1 wherein R is an aryl hydrocarbon having 6–8 carbon atoms, $R_1$ is hydrogen, and $R_2$ is monohalophenyl.

7. A compound of claim 1 wherein R is an aryl hydrocarbon having 6–8 carbon atoms, $R_1$ is hydrogen, and $R_2$ is alkyl having 1–8 carbon atoms.

8. A compound having the formula

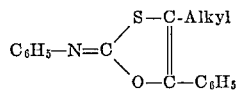

wherein said alkyl has 1–8 carbon atoms.

9. A compound having the formula

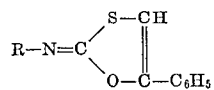

wherein R is alkyl having 1–18 carbon atoms.

10. A process for preparing an imino-1,3-oxathiol which comprises reacting
(a) an S-chloroisothiocarbamyl chloride of the formula

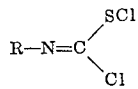

wherein R is alkyl having 1–18 carbon atoms, cycloalkyl having 5–7 carbon atoms, an aryl hydrocarbon group having 6–8 carbon atoms, phenyl having a lower alkoxy substituent, monohalophenyl, dihalophenyl or nitrophenyl; with
(b) a ketone of the formula

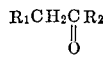

wherein $R_1$ is hydrogen, alkyl having 1–8 carbon atoms, aryl having 6–8 carbon atoms or aralkyl having 7–9 carbon atoms; and wherein $R_2$ is aryl having 6–8 carbon atoms, monohalophenyl, nitrophenyl or phenyl having a lower alkoxy substituent;
(c) at a temperature range of about 0° C. to about 70° C. in the presence of a diluent to provide a hydrochloride salt of said imino-1,3-oxathiol, and converting said salt to said imino-1,3-oxathiol.

11. The process of claim 10 wherein a temperature range of 25° C. to 55° C. is employed.

12. The process of claim 10 wherein the imino-1,3-oxathiol is isolated in the form of its hydrochloride salt.

13. A process for preparing an imino-1,3-oxathiol which comprises reacting (a) an S-chloroisothiocarbamyl chloride of the formula

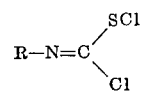

wherein R is alkyl having 1–18 carbon atoms, cycloalkyl having 5–7 carbon atoms, an aryl hydrocarbon group having 6–8 carbon atoms, phenyl having a lower alkoxy substituent, monohalophenyl, dihalophenyl or nitrophenyl; with
(b) a ketone of the formula

wherein $R_1$ is hydrogen, or alkyl having 1–8 carbon atoms; and wherein $R_2$ is alkyl having 1–8 carbon atoms or cycloalkyl having 5–7 carbon atoms; or a cycloaliphatic ketone having 5–14 carbon atoms;
(c) at a temperature range of about 0° C. to about 70° C. in the presence of a diluent to provide a first intermediate product,
(d) treating said first intermediate product with a strong organic base to provide a second intermediate product,
(e) heating said second intermediate product at a temperature of at least about 40° C. to provide a hydrochloride salt of said imino-1,3-oxathiol, and
(f) converting said salt to said imino-1,3-oxathiol.

14. The process of claim 13 wherein the imino-1,3-oxathiol is isolated in the form of its hydrochloride salt.

References Cited

UNITED STATES PATENTS 3,193,561  7/1965  Addor _____ 260—327

OTHER REFERENCES

De Stevens et al.: Jour. Amer. Chem. Soc., vol. 79 (1957), p. 5263.

JAMES A. PATTEN, *Primary Examiner.*

U.S. Cl. X.R.

260—999